US011687811B2

(12) United States Patent
Appel et al.

(10) Patent No.: US 11,687,811 B2
(45) Date of Patent: Jun. 27, 2023

(54) PREDICTING USER QUESTION IN QUESTION AND ANSWER SYSTEM

(71) Applicant: International Business Machines Corporation, Armonk, NY (US)

(72) Inventors: Ana P. Appel, Sao Paulo (BR); Andre Gama Leal, Sao Paulo (BR); Renan Francisco Santos Souza, Rio de Janeiro (BR)

(73) Assignee: International Business Machines Corporation, Armonk, NY (US)

(*) Notice: Subject to any disclaimer, the term of this patent is extended or adjusted under 35 U.S.C. 154(b) by 947 days.

(21) Appl. No.: 16/579,355

(22) Filed: Sep. 23, 2019

(65) Prior Publication Data

US 2020/0019876 A1 Jan. 16, 2020

Related U.S. Application Data

(63) Continuation of application No. 15/171,055, filed on Jun. 2, 2016, now Pat. No. 10,607,146.

(51) Int. Cl.
*G06N 20/00* (2019.01)
*G06N 7/01* (2023.01)
*G06N 5/04* (2023.01)

(52) U.S. Cl.
CPC .............. *G06N 7/01* (2023.01); *G06N 5/04* (2013.01)

(58) Field of Classification Search
None
See application file for complete search history.

(56) References Cited

U.S. PATENT DOCUMENTS

| 7,908,143 | B2 | 3/2011 | Kankar et al. | |
|---|---|---|---|---|
| 8,346,701 | B2 | 1/2013 | Wang et al. | |
| 8,768,867 | B1 | 7/2014 | Thaeler et al. | |
| 2008/0095355 | A1* | 4/2008 | Mahalaha | H04M 3/5233 379/265.09 |
| 2010/0031308 | A1 | 2/2010 | Khalid | |
| 2010/0235343 | A1 | 9/2010 | Cao et al. | |
| 2011/0145038 | A1 | 6/2011 | Ghosh et al. | |

(Continued)

OTHER PUBLICATIONS

Aldabe, I., et al., "Ariklturri: An Automatic Question Generator Based on Corpora and NLP Techniques", ITS 2006, LNCS, Jun. 2006, pp. 584-594, vol. 4053.

(Continued)

*Primary Examiner* — David R Vincent
(74) *Attorney, Agent, or Firm* — Scully, Scott, Murphy & Presser, P.C.; Peter J. Edwards

(57) ABSTRACT

A question database storing questions and a conditional probability of one question to be asked given that a previous question was asked is searched to predict a future question based on the conditional probability stored in the question database given an input question as the previous question. The future question is suggested to a user. Responsive to receiving an acceptance of the future question, the question database is updated to strengthen the conditional probability associated with the future question occurring given the input question. An answer to the future question can be provided and searching, predicting, suggesting and updating may be repeated, with the future question as the input question, until the future question is declined.

19 Claims, 9 Drawing Sheets

(56) References Cited

U.S. PATENT DOCUMENTS

| | | | |
|---|---|---|---|
| 2011/0191270 A1* | 8/2011 | Peng | G06N 5/04 |
| | | | 706/10 |
| 2013/0097061 A1 | 4/2013 | Saich et al. | |
| 2014/0006012 A1 | 1/2014 | Zhou et al. | |
| 2014/0163962 A1 | 6/2014 | Castelli et al. | |
| 2014/0222822 A1 | 7/2014 | Jenkins et al. | |
| 2014/0278754 A1 | 9/2014 | Cronin et al. | |
| 2015/0161106 A1 | 6/2015 | Barbetta et al. | |
| 2015/0325133 A1* | 11/2015 | Gaglani | G09B 7/00 |
| | | | 434/322 |
| 2016/0180248 A1 | 6/2016 | Regan | |
| 2016/0350870 A1 | 12/2016 | Morin et al. | |
| 2017/0092278 A1* | 3/2017 | Evermann | G10L 15/22 |

OTHER PUBLICATIONS

List of IBM Patents or Patent Applications Treated as Related dated Sep. 23, 2019, 2 pages.

* cited by examiner

PREDICTING USER QUESTION IN QUESTION AND ANSWER SYSTEM

FIELD

The present application relates generally to computers and computer applications, and more particularly to machine learning, natural language processing, and question and answering system.

BACKGROUND

Question answering systems (also referred to as question and answer systems) are automatic computer systems that utilize information retrieval and natural language processing to automatically answer questions, for example, presented in natural language. A question and answer system, for example, may perform a search of online or web-based data to provide answers. Given the large volume of available data, however, searching for an answer is time-consuming. There may be a significant number of candidate answers that is either not related or focused on the question or is of no interest to the user asking the question.

BRIEF SUMMARY

A method of predicting and presenting a future question in an automated question answering system may be provided. The method, in one aspect, may include receiving an input question in the automated question answering system. The method may also include providing an answer to the question. The method may further include searching a question database storing questions and a conditional probability of one question to be asked given that a previous question was asked, for all questions in the question database, the conditional probability determined based on a supervised learning algorithm, natural language processing that determines distance metric between the questions, and user data obtained from a plurality of data sources. The method may also include predicting the future question based on the conditional probability stored in the question database given the input question as the previous question. The method may further include suggesting the future question on a user interface. The method may also include, responsive to receiving an acceptance of the future question, updating the question database to strengthen the conditional probability associated with the future question occurring given the input question. The method may further include providing an answer to the future question. The method may also include repeating the searching, the predicting, the suggesting and the updating, with the future question as the input question until the future question is declined.

A system of predicting and presenting a future question in an automated question answering system, in one aspect, may include, at least one hardware processor coupled to a communication network. A storage device may be coupled to the at least one hardware processor. The at least one hardware processor may be operable to receive an input question in the automated question answering system. The at least one hardware processor may be further operable to provide an answer to the question. The at least one hardware processor may be further operable to search a question database storing in the storage device, questions and a conditional probability of one question to be asked given that a previous question was asked, for all questions in the question database, the conditional probability determined based on a supervised learning algorithm, natural language processing that determines distance metric between the questions, and user data obtained from a plurality of data sources. The at least one hardware processor may be further operable to predict the future question based on the conditional probability stored in the question database given the input question as the previous question. The at least one hardware processor may be further operable to suggest the future question on a user interface. Responsive to receiving an acceptance of the future question, the at least one hardware processor may be further operable to update the question database to strengthen the conditional probability associated with the future question occurring given the input question. The at least one hardware processor may be further operable to provide an answer to the future question. The at least one hardware processor may be further operable to repeat the searching, the predicting, the suggesting and the updating, with the future question as the input question until the future question is declined.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, computer program product and technique may be provided that automatically predict a future question that a user may pose to a question and answer system for example in a course of a conversation. Prediction of future questions can speed up and therefore improve the process of finding a proper and customized answer, and also increase user-machine interaction with the question answering system.

A system that includes one or more hardware processors, and/or or a method performed by one or more processors, in some embodiments, may predict a possible question that users will pose in a question and answer system interaction. The system and/or method in some embodiments may use context and also user profile information in sources such as social network, mobile data, wearable device data, news feed, and/or type of interaction (voice or typing), to determine the intentions of the user and rank the possible questions as future questions the user will ask.

In some embodiments, the predictions initially may be performed using a dataset built based on information obtained from domain specialists. The most probable future question may be predicted and suggested to the user. This allows not only saving time to search, but also time to input the question on the system. In some embodiments, users' feedback of the suggestions allied with machine learning algorithms allows the system to improve the accuracy of its predictions. In addition to the history of questions and feedback, the methodology of the present disclosure in some embodiments also takes user data from many different sources, for example, social network, mobile data, wearable data, and/or other data into account to predict future questions. For example, the methodology of the present disclosure in some embodiments may predict questions a user may ask in a question and answer chat and suggest it to the user. In some embodiments, the prediction's accuracy is improved over time using machine learning algorithms and user-provided data from social media, wearable devices, and/or others.

Figure 1:
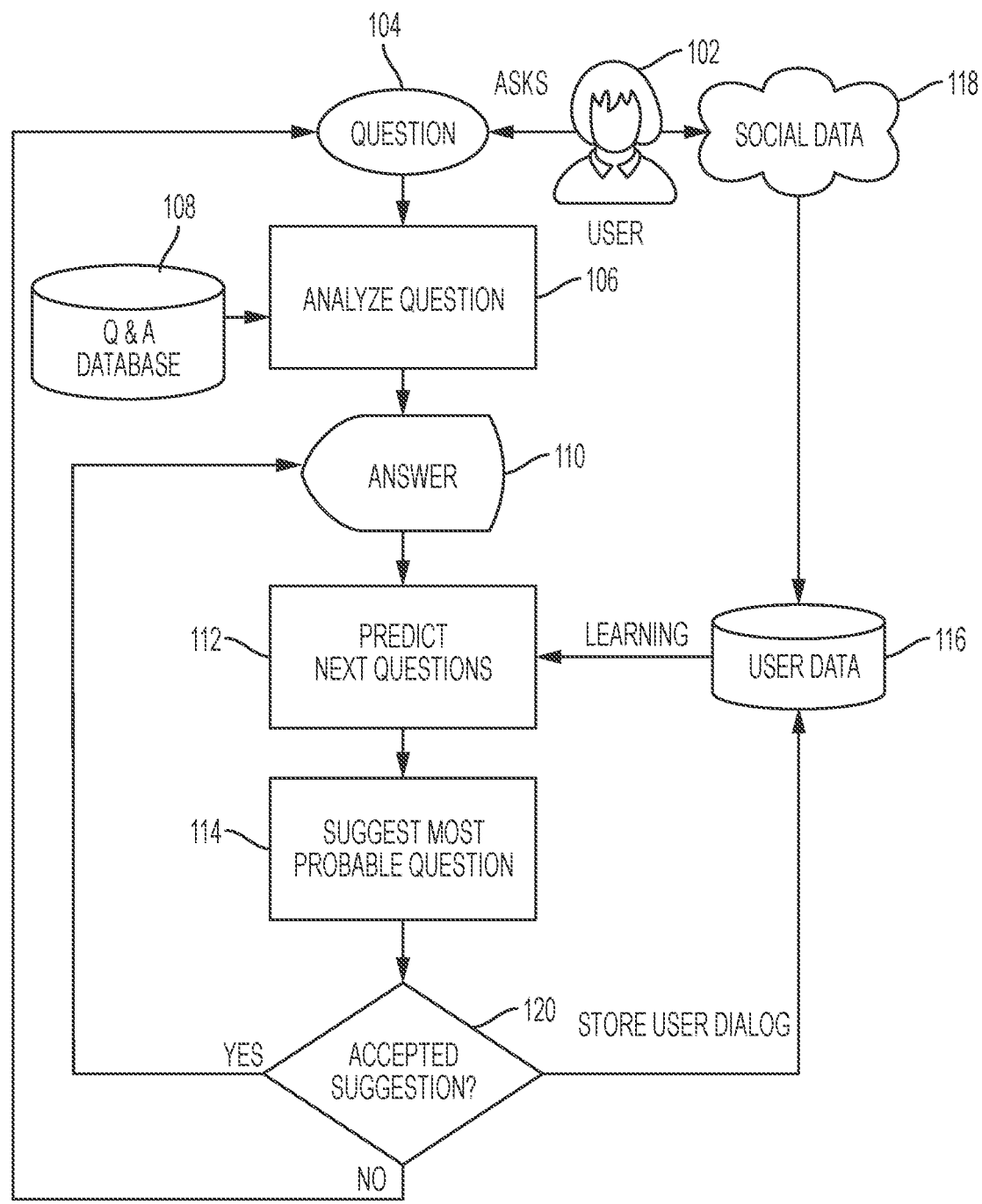
FIG. 1 is a flow diagram illustrating a method in one embodiment of the present disclosure.

FIG. 1 is a flow diagram illustrating a method in one embodiment of the present disclosure. A workflow in the method may start as a user 102 begins to interact with a question and answer system or like system by asking or posing a question 104 about a domain. At 106, the question 104 is analyzed, for example, by the question and answer system, for example, by one or more hardware processors. If the question has been previously stored in the system's database, for example, question and answer (Q&A) database 108, an answer may be ready to be delivered to the user. Since a question with the same meaning may be asked in many different variations (e.g., "what is investment?" and "can you define investment?"), Natural Language Processing (NLP) methods in some embodiments are utilized to increase the chance of the system to match the user's question with one that has already been registered in the database 108 before. If the question 104 has not been previously registered, the system may search the Internet or another source (e.g., online source) to find an answer, for example, with a text and/or audio. For example, news websites, online encyclopedias, data from experts in social media, and any other data source that may be of interest may be utilized. If an answer 110 is found on the Internet, the system may ask for a feedback by asking if the found answer was what the user 102 was expecting as an answer. If the user 102 responds positively, this Question and Answer pair may be added to the Q&A database 108. If the user 102 responds negatively or if the search on the Internet has not returned relevant information, a message may be sent containing a text that an answer could not be found, e.g., "Sorry, I could not find an answer to your question." The user 102 may be allowed to make a new question at 104.

Once the system has answered what has been asked and the user has acknowledged that the answer actually corresponds to the question, the system and/or method in some embodiments of the present disclosure predicts a next question at 112 that the user could make or would like an answer to. In some embodiments, the predicted question is suggested to the user by asking the user to confirm whether the user would like an answer to such predicted question. If the user responds positively, the system and/or method in some embodiments predicts a new question, for example, at 112. Otherwise, if the user responds negatively, the system and/or method in some embodiments stops predicting and allows the user to make a new question and the process is repeated at 104.

In some embodiments, for all questions in the Q&A database 108, there is a probability of one question to be asked after another. For example, if a user poses a question, "what is investment?" there is a high probability that the following question the user may ask will be "what investments are there to invest?". In some embodiments, for all pair of questions (Qx, Qy), a conditional probability is determined, which represents the probability that the question Qy will be asked given that Qx has been asked previously. In some embodiments, the conditional probabilities are stored in a weighted directed graph data structure, whose nodes are questions and the weight in an edge between two nodes indicate the conditional probability between two questions. We also note that it is possible that more than one edge may extend out from a node. More than one edge from a node indicates that following an answered question, the user may ask two or more different questions. In some embodiments, when there is more than one edge from a node, the system and/or method may select the edge with greater weight to determine the next question to suggest to the user as the predicted question at 114.

In some embodiments of the present disclosure, the system and/or method may build or generate the weighted directed graph data structure and probabilities that define the prediction flow based on the following aspects: (i) supervised learning algorithms, such as neural networks, to predict new links; (ii) NLP algorithms to discover links among existing questions; (iii) user-provided content from multiple data sources (e.g., user's data from social media, mobile devices, wearable devices, etc.) also to discover links. Any one or combinations of those aspects may be implemented to build the weighted directed graph data structure and probabilities that define the prediction flow. In some embodiment, rules based, deep learning (e.g., neural network) and other machine learning algorithms may be utilized.

Supervised learning algorithms implemented based on knowledge of domain specialists may predict new links. NLP algorithms may discover links among existing questions. User provided content may be correlated to existing questions using machine learning algorithms. For example, the system and/or method in some embodiments may implement supervised learning as follows. The system and/or method in some embodiments may build a training dataset based on the knowledge of domain-specialists. Such knowledge may be obtained from data sources, such as news websites, social media, online forums, and/or others. The training dataset in some embodiments includes data to build the weighted directed graph with a set of initial nodes and weights. With this dataset built, the system and/or method of the present disclosure in some embodiments may train a supervised learning algorithm, such as a neural network, to expand the initial graph by discovering new links and their probabilities.

In some embodiment of the present disclosure, NLP algorithms determine distance between two texts, which are used to identify similar questions in the existing Q&A database 108. For example, in some embodiment, the conditional probability between two questions is determined as being inversely proportional to the distance between them. For instance, a link between two similar (i.e., closer in distance metric) questions is likely to have a greater conditional probability than a link between two dissimilar (i.e., farther in distance metric) questions.

In some embodiments, user-provided content, for example, at 116, allows the system and/or method of the present disclosure to make custom predictions based on the user who is currently using the question and answer system or the like. The user data at 116 may also include data from sources such as source media data 118. Utilizing user-provided content increases the chance of the system to suggest a question that the user is actually interested in. By analyzing user-provided data from multiple different data sources (e.g., social media, mobile and wearable devices, history search on search engines, etc.), the system and/or method in some embodiments may correlate such user data to the existing questions and answers in the Q&A database 108. In some embodiment, such correlation is automatically discovered using machine-learning methods, e.g., supervised and/or unsupervised. For instance, based on user preferences 116, the conditional probabilities between two questions may vary and this in some embodiments is reflected on the graph being built.

In some embodiment, the NLP algorithm discovered factors (e.g., distance metric) and user provided data, for example, in addition to user interaction with the system (collecting feedback of predictions), may be utilized to extend the training dataset used in a supervised learning algorithm. The extended training dataset may be utilized to retrain the machine-learning algorithm and improve its accuracy to make better predictions. The retraining may be performed autonomously by the system and/or method, based on the availability of the additional data, for example, from NLP algorithms and user provided content 116.

Based on the weighted directed graph, the most probable question is suggested to the user at 114. For instance, if the user wants to know the answer to the predicted questions at 120, it is presented and a new question is predicted by the system and the process repeats at 110. If the user does not want to know the answer to the predicted question, the system stops predicting and allows the user to make another question. The process repeats with the new question at 104. In some embodiment, user dialog, for example, whether the user accepted or declined the follow up or suggested question, may be recorded, for example, stored in the user data 116.

The system and/or method in one aspect solve a problem of predicting a future question a user may ask in a Q&A chat system or the like system. Predicting a future question may increase the efficiency in computer processing in finding an answer and help steer a user in a question flow. The system and/or method in some embodiments use user provided data to make custom predictions based on the user who is currently using it. In one aspect, the predictions' accuracy improves over time as machine learning algorithms create new links between questions, discover similarity between them and analyze user's interests. The system and/or method may be applicable in a number of different applications, including but not limited to, finance or health advisors, virtual information technology (IT) support, an entertainment focused applications, and/or others.

For example, in a finance advisor chat system, the system and/or method of the present disclosure may suggest questions and answers for investments the user may be interested in, increasing the complexity of the suggested questions as the user's knowledge in finance field improves.

The following describes an example dialog in finances domain:

A user poses a question, Q1: "What is investment?" System generates answer A1: "According to XYZ source, in finance, investment is buying or creating an asset with the expectation of capital appreciation, dividends (profit), interest earnings, rents, or some combination of these returns." System asks: "Is this the answer you expected?" User responds: "Yes". System suggests question Q2: "Would you like to know what kinds of investment there are?" User responds: "Yes". System answers: "There are Investment A and Investment B". System suggests question Q3: "Would you like to know more about Investment A"? User responds: "Yes". System answers: "According to XYZ source, it is part of the income that is not spent when received hence is saved for a future moment." System suggests question Q4: "Would you like to know how Investment A's yield is calculated?" User responds: "No". System responds: "OK. You can make any other question then."

For this small sample, the following conditional probabilities may be used to populate a training dataset: P(Q2|Q1)=0.92 P(Q3|Q2)=0.74 P(Q4|Q3)=0.48. In addition to question Q4, the system could have suggested the question Q5: "Would you like to know more about Investment B?" However, in this hypothetical example, P(Q5|Q3)=0.37. Since P(Q4|Q3)>P(Q5|Q3), question Q4 was suggested instead of Q5.

In a health advisory chat system, in addition to the relationship between the questions, user provided data may further aid in accurately predicting the questions. For instance, user specific information such as the user location may be used to suggest questions about health in context of locations, for example, common disease in the user's current location.

The following illustrates an example dialog in health domain:

User poses question Q1: "What are the symptoms of Dengue fever?" System answers A1: "According to XYZ source, symptoms include fever, headache, muscle and joint pains, and a characteristic skin rash that is similar to measles. In a small proportion of cases, the disease develops into the life-threatening dengue hemorrhagic fever, resulting in bleeding, low levels of blood platelets and blood plasma leakage, or into dengue shock syndrome, where dangerously low blood pressure occurs." System asks: "Is this the answer you expected?" User responds: "Yes". System suggests question Q2: "Would you like to know how Dengue is transmitted?" User responds: "Yes". System answers: "Dengue is transmitted by several species of mosquito within the genus *Aedes*, principally *A. aegypti*." System suggests question Q3: "According to your location, you may be interested to know about Zika fever. Is this correct?" User responds:

"Yes". System answers: "According to XYZ source, Zika fever is an illness caused by the Zika virus, a member of the family Flaviviridae." System suggests question Q4: "Would you like to know the symptoms of Zika fever?" User responds: "No". System responds: "OK. You may ask another question then."

For this example, the following conditional probabilities may be used to populate a training dataset: $P(Q2|Q1)=0.85$ $P(Q3|Q2)=0.62$ $P(Q4|Q3)=0.75$. This example shows the use of user data users' profiles (e.g., social network, mobile, wearable devices, and/or others) to increase the chance of the system suggesting a question that the user is actually interested. For example, instead of asking question Q3, the system could have suggested question Q5: "Would you like to know more about yellow fever?". Both questions are related to the previous question Q2, however, question Q3 may have been determined to be more popular in the user's current location at the current time, and therefore, may have higher conditional probability, e.g., $P(Q3|Q2)=0.62$ while Q5 have $P(Q5|Q2)=0.44$. Since $P(Q3|Q2)>P(Q5|Q2)$, question Q3 was suggested.

Figure 2:
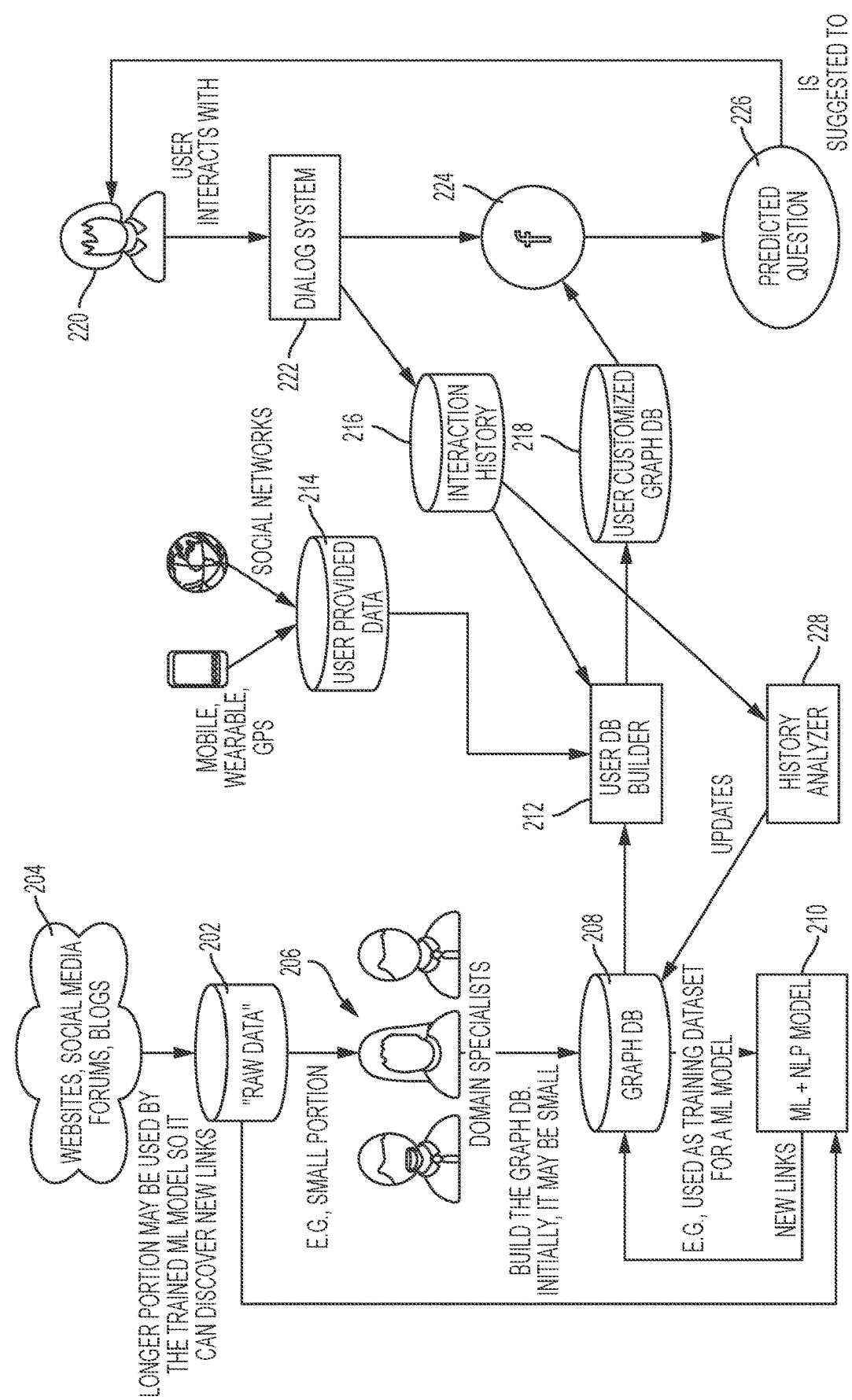
FIG. 2 is a diagram illustrating components that predict future questions in a question answering system in one embodiment of the present disclosure.

FIG. 2 is a diagram illustrating prediction of future questions in one embodiment of the present disclosure. Data referred to as raw data 202 may be obtained from sources 204 such as websites, social media, online forums, blogs, and/or others, for example, over a communication network or a network of computer such as the Internet and stored in a storage device. With this data 202, using the knowledge of domain-specialists 206, for example, the system and/or method in some embodiments creates questions and clusters them, for example, by topic and complexity level. These questions are stored in a directed weighted graph-like database 208 as a directed weighted graph. The weight is used to differentiate closer questions. In some embodiments, this initial directed weighted graph is relatively small and may be built using a small portion of the raw data 202. The dataset 208 is used to train a machine learning model 210 to create additional links to questions in the directed weighted graph, for example, using the rest of the raw data 202. An NLP model 210 may be also used to build the directed weighted graph.

Figure 3:
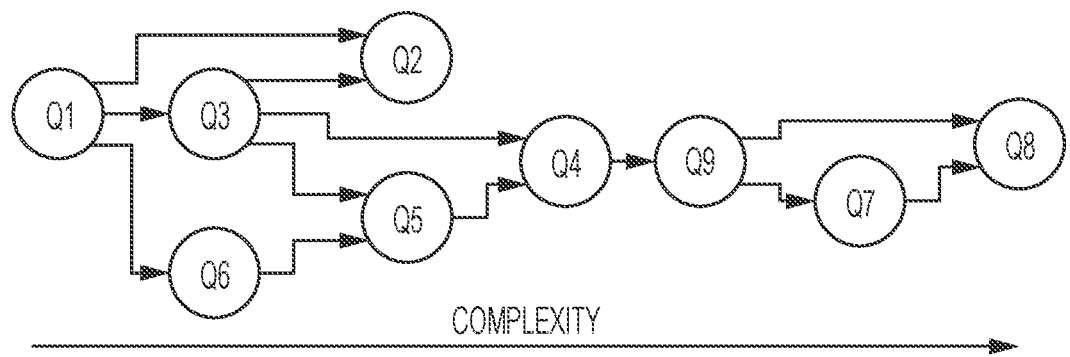
FIG. 3 shows an example of a directed graph that links questions in one embodiment of the present disclosure.
Figure 4:
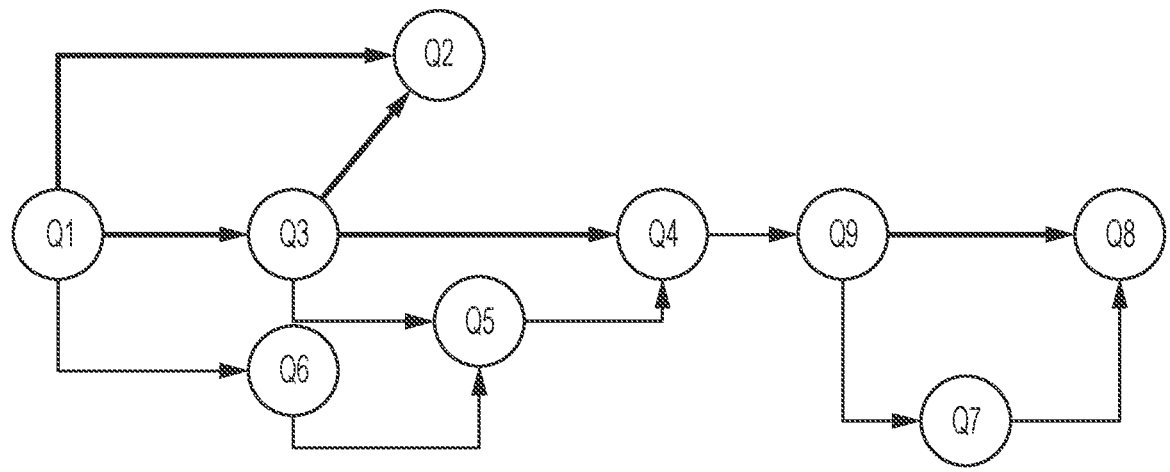
FIG. 4 shows an example of a directed weighted graph that links questions in one embodiment of the present disclosure.

FIG. 3 shows an example of a directed graph that links questions in one embodiment of the present disclosure. The questions may be linked in increasing order of complexity. For example, more complex questions require more previous knowledge in the domain the questions are applicable. FIG. 4 shows an example of a directed weighted graph that links questions in one embodiment of the present disclosure. The same graph as in FIG. 3 is shown with weights. In the representation shown in the figure, thicker edges have more weight. An example question in the node labeled Q1 may include "What is disease?". Example question in the node labeled Q2 may include "Is there a common disease during the summer?" Example question in the node labeled Q3 may include "What disease should I be concerned about in LocationX?" Example question in the node labeled Q4 may include "What is zika fever?" Example question in the node labeled Q5 may include "What is dengue fever?" Example question in the node labeled Q6 may include, "What diseases are transmitted by mosquitoes?" Example question in the node labeled Q7 may include "What are the treatments for zika fever?" Example question in the node labeled Q8 may include "Is there any vaccine to zika fever?" Example question in the node labeled Q9 may include "What are the symptoms of zika fever?"

Based on the distance and the complexity gap between the questions, the probabilities of a question to be asked after another are calculated. Distance and complexity gap may be determined by using NLP algorithm. For example, an NLP algorithm may identify closeness of questions and complexity of questions based on specialized vocabulary. The distance and complexity gap between questions may be also obtained by domain specialists inputting the distance and complexity.

Figure 5:
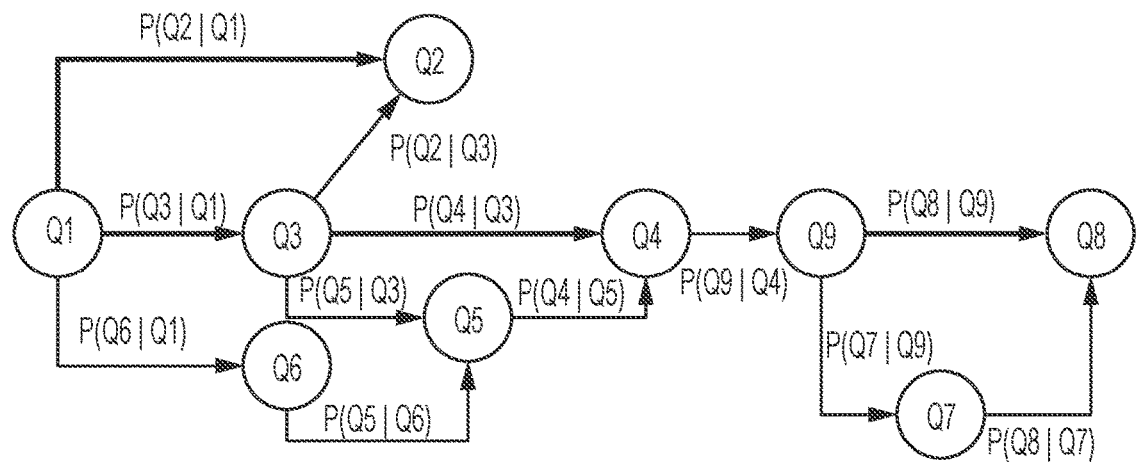
FIG. 5 shows an example directed weighted graph with example probabilities in one embodiment of the present disclosure.

FIG. 5 shows an example directed weighted graph with example probabilities. For example, $P(Qx|Qy)$ represents probability of Question x given Question y. Responsive to a user asking a question, for example, stored in a database, and presenting its answer, the system and/or method of the present disclosure suggests to the user the question with highest probability of being asked next. For instance, consider that $P(Q2|Q1)=0.40$; $P(Q3|Q1)=0.25$; $(Q6|Q1)=0.15$. The question with highest probability given question Q1 was asked, is Q2, i.e., $P(Q2|Q1)=0.40$. Therefore, in this example, if Q1 is asked by the user, then Q2 is suggested to the user as a next question based on the example directed weighted graph.

Referring back to FIG. 2, the system and/or method of the present disclosure may update constantly and dynamically the questions and answers and its links and probabilities 208, for example, considering supervised learning algorithms, natural language processing algorithms, and user provided content and user interaction. A supervised learning algorithm 210, such as neural network, uses raw data 202 available on internet 204 to expand the initial graph by discovering new links between the questions. Thus, the probabilities are recalculated.

Figure 6:
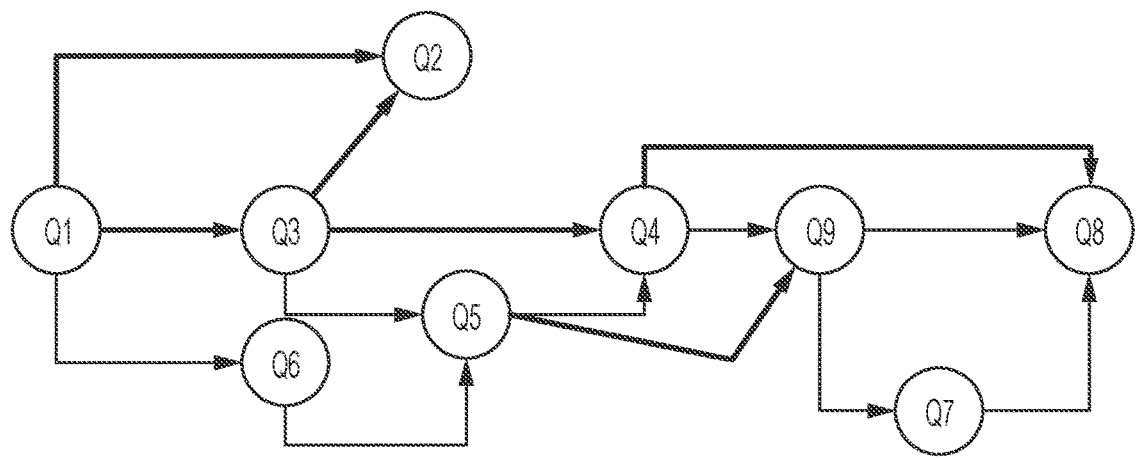
FIG. 6 shows an example directed weighted graph that is updated with recomputed probabilities based on learning, for example, from additional data in one embodiment of the present disclosure.

FIG. 6 shows an example directed weighted graph that is updated with recomputed probabilities based on learning, for example, from additional data. $P(Q9|Q5)=0.05$ may be updated to $P(Q9|Q5)=0.3$; $P(Q8|Q4)=0.02$ may be updated to $P(Q8|Q4)=0.25$.

Figure 7:
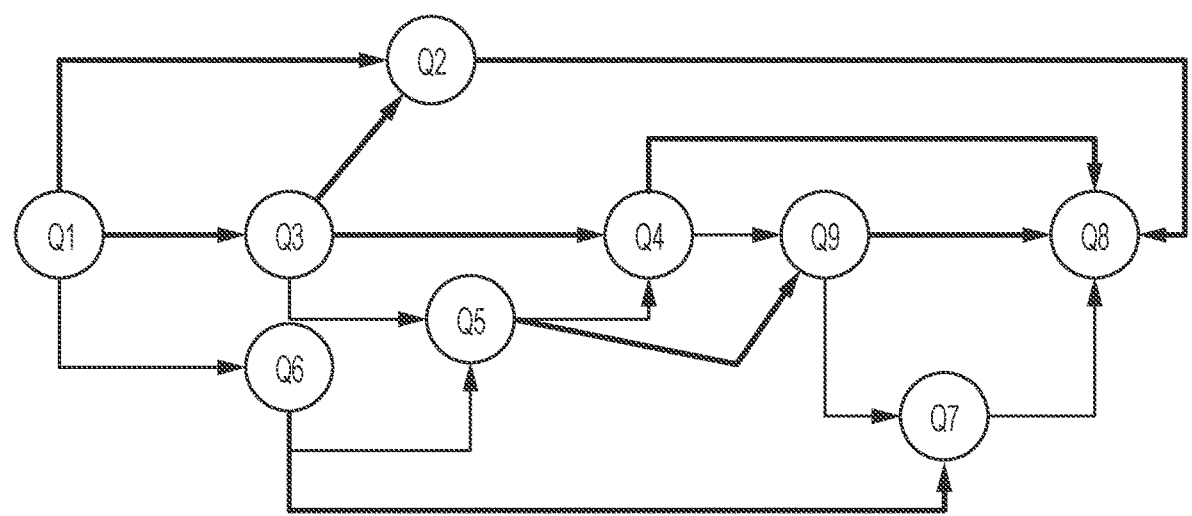
FIG. 7 shows an example directed weighted graph that is updated based on the natural language processing (NLP) determining a distance between questions in one embodiment of the present disclosure.

In some embodiments, NLP algorithms, such as distance between two texts, are used to identify similar questions in the Q&A database, changing the probabilities of the initial graph. FIG. 7 shows an example directed weighted graph that is updated based on the NLP determining a distance between questions, for example, Q6 that asked "What disease are transmitted by mosquitoes?" and Q7 that asked "What are the treatments for zika fever?" The previously obtained weight or probability of Q7 give Q6 may be updated, for example, as $P(Q7|Q6)=0.04$ to $P(Q7|Q6)=0.15$. Similarly, the previously obtained weight or probability of Q8 give Q2 may be updated, for example, as $P(Q8|Q2)=0.06$ to $P(Q8|Q2)=0.12$.

In some embodiments, the system and/or method of the present disclosure in one embodiment may use user's interaction with the system and additional data provided by the user to make custom predictions based on the user's interests. For instance, a user database (DB) builder component 212, executable or executing on one or more hardware processors, may build user database based on the user interaction history data 216 and/or user provided data 214. This user data is used to build a customized graph database 218 where the probabilities of the questions are changed or updated to reflect the particular user's interests. The customized graph database 218 may be built for a user (e.g., customized for a particular user). In some embodiments, the customized graph database is built with the analysis of the user's interaction history and of optional user provided data from many different possible sources. From these data, algorithms can identify topics the user is more interested in. The questions related to these topics have an increased probability of being asked. These probabilities are synchronized every time the User DB Builder 212 analyzes the gathered data and identifies new possible topics of interest of the user. This may happen each time the user asks a new question or from time to time, depending on the application. In some embodiments, only the probabilities are customized to every user so that it is not necessary to have a copy of the entire DB on the user's machine. The customized graph database 218 may be built based on the following sources: the general directed weighted graph database 208; user provided data 214, for example, from different sources (e.g., computer-implement social networks and/or media, global positioning system (GPS), mobile and wearable devices, and/or others); and user interaction history 216 with the system of the present disclosure in one embodiment. Interaction history 216 may be built based on storing user interactions of a user 220 interacting with a dialog system 222 that receives questions and provides answers. In one aspect, user provided data may not always be available and there may also be no interaction history in the system at all times. The user provided data 214, when available, may be used by machine-learning methods which correlate this data with the existing questions in the database. Thus, all the questions related to the user's interests have an increased probability of being asked. In one embodiment, the selection of the relevant data may be performed by each application of the system. For example, for a health advisor application, data indicating the current location and heart-beating may be considered more useful data than the data indicating web pages liked on social network application or website page. A user 220 interacting with a dialog system 222, for example, a question and answer system, may pose a question and receive an answer. Future questions 224 may be predicted based on the user customized graph database 218. A predicted question 226 may be suggested to the user 220.

Figure 8:
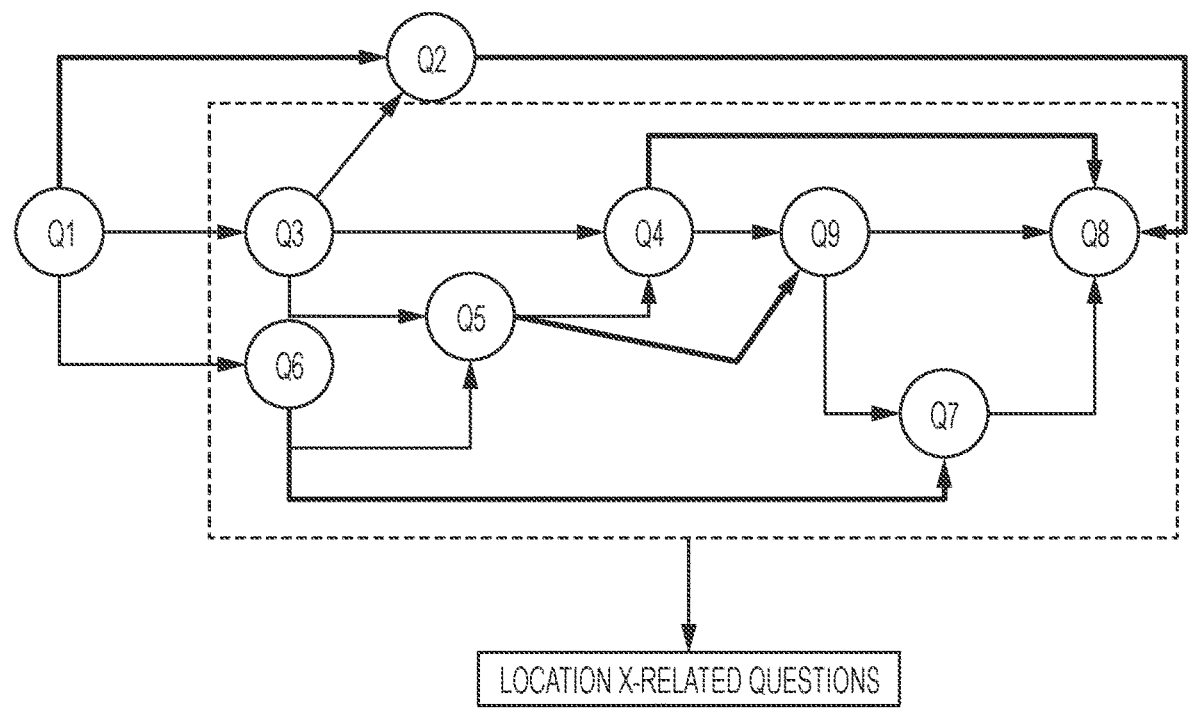
FIG. 8 shows an example directed weighted graph with selected questions relating to a user context in one embodiment of the present disclosure.

The following describes an example use case scenario. A user checked in at location X. This information, for example, is available via a social network application or another application that is aware of the user's current location, for example, utilizing GPS. Questions relating to this information may be considered important to a health advisor application using the question and answer system, and questions relating to location X (e.g., Q3, Q4, Q5, Q6, Q7, Q8 and Q9) may be selected and their probabilities may be updated. FIG. 8 shows an example directed weighted graph with selected questions relating to a user context (in this example, location X). In one embodiment, the directed weighted graph showing a set of questions may be displayed on the user interface.

In some embodiments, users' interactions with a dialog system 222 are stored in an interaction history database 216. With this data 216, the system and/or method of the present disclosure may identify one or more topics in a given domain the user is most interested in. In one aspect, using the interaction history database 216 allows for identifying users' interests without having to use external data. Interaction history analysis module or component 228 executing one or more hardware processors may search for and find questions related to the users' interests based on the interaction history database 216. Then the questions related to the users' interests found by the interaction history analysis module have increased probability of being asked next, for example, similarly to the interests found by user provided data.

The interaction history analyzer 228 may access the users' interaction history databases 216 and use all the users' interactions data available to identify possible new links between the questions. That is, if a high percentage of users ask a question Qy after Qx, then there is probably a link between these questions. The interaction history analyzer 228 may update the directed weighted graph database 208 with the new links.

Figure 9:
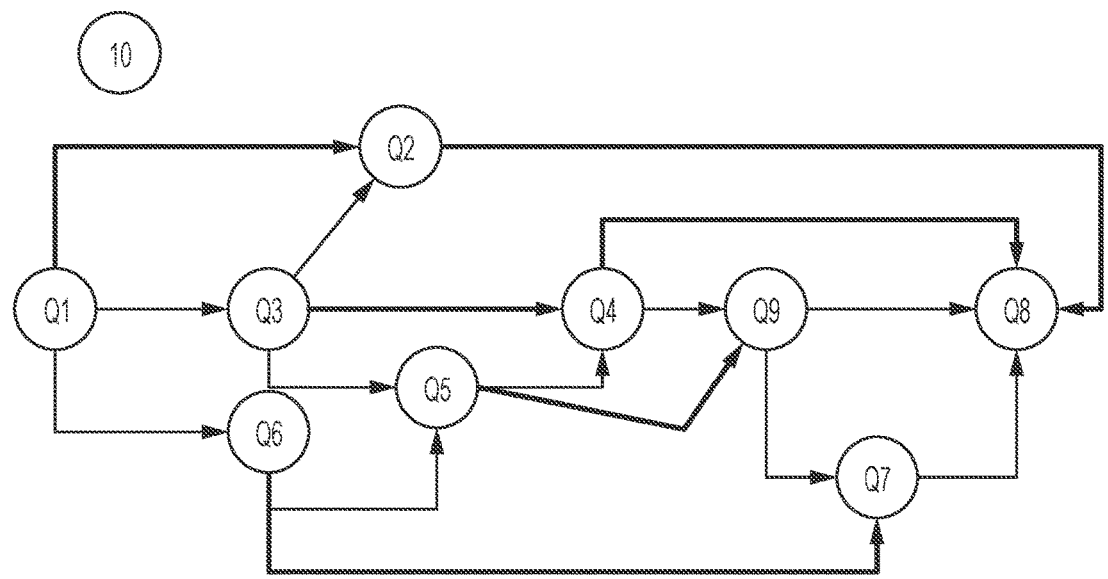
FIG. 9 shows a database of questions structured as a directed weighted graph in one embodiment of the present disclosure with a new question added to the database.
Figure 10:
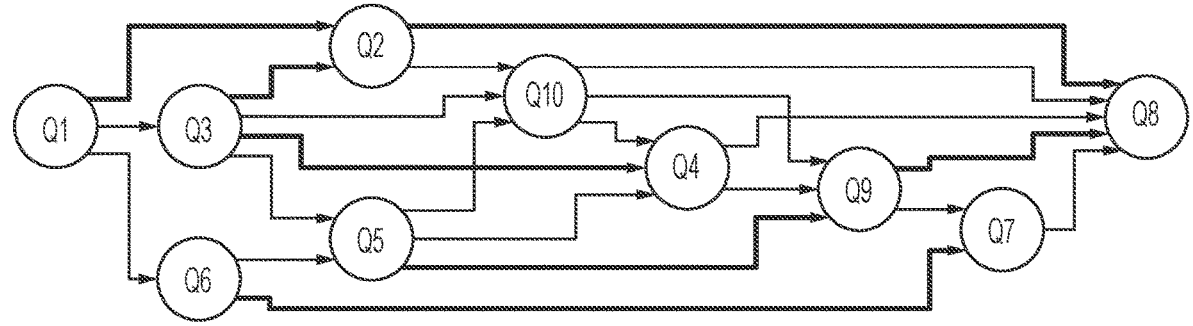
FIG. 10 shows example database of questions organized structured as a directed weighted graph in one embodiment of the present disclosure with a new link including a new question added to the database.

In some embodiments, if the user asks a question not previously stored in the database its answer is searched, for example, in other sources such as the Internet. If the answer is found, then the Q&A pair is added to the database (e.g., graph DB at 208). For example, the graph DB 208 may include answers, but not every question may have a stored answer since it may be dynamic, for example, an answer that may vary according to time. If a user asks a question not previously stored in the graph DB 208, there may be no answer stored in the database for the question. If the system can find an answer, the Q&A pair is added to the DB 208. In some embodiment, the graph DB 208 stores those questions it can answer. Even if the answer is not stored (e.g., as in the case of dynamic answers) the system has the means (e.g., hyperlinks to the location with an answer, equations, and/or others) to answer the stored question. FIG. 9 shows a database of questions structured as a directed weighted graph in one embodiment of the present disclosure with a new question, for example, Q10, added to the database. The NLP and ML algorithms (e.g., FIG. 2 at 210) may be executed to identify a link for the new question. In this way, predictions' accuracy may be further improved. FIG. 10 shows example database of questions organized structured as a directed weighted graph in one embodiment of the present disclosure with a new link including a new question, e.g., Q10, added to the database.

The following illustrates an example use case scenario described above in health domain: Via a user interface provided by a dialog system or question and answer system, a user asks question Q1: "What are the symptoms of Dengue fever?" System answers A1: "According to XYZ source, symptoms include fever, headache, muscle and joint pains, and a characteristic skin rash that is similar to measles. In a small proportion of cases, the disease develops into the life-threatening dengue hemorrhagic fever, resulting in bleeding, low levels of blood platelets and blood plasma leakage, or into dengue shock syndrome, where dangerously low blood pressure occurs." System asks: "Is this the answer you expected?" User responds: "Yes". System retrieves data from user customized graph database (e.g., FIG. 2 at 218) and finds most probable next question Q2. System suggests question Q2: "Would you like to know how Dengue is transmitted?" User responds: "Yes". System updates interaction history database (e.g., FIG. 2 at 216), for example, with data that user preferred Q2 after Q1. User DB Builder (e.g., FIG. 2 at 212) updates user customized graph database (e.g., FIG. 2 at 218). User DB Builder (e.g., FIG. 2 at 212) also updates the general graph DB (e.g., FIG. 2, 208). For example, the conditional probability of Q2 occurring given that previous question Q1 was asked may be reinforced. For instance, both user customized graph DB and the general graph DB are updated from a user's interaction history database. In some embodiments, the interaction history data of each user is analyzed to identify the topics the user is most interested in, and this is used to enhance the probabilities of the questions related to these topics. In some embodiments, the interaction histories data of every user are used by the history analyzer to find new links between questions, analyzing which questions the users usually make after other questions. In some embodiments, these new links are updated to the general Graph DB which is used to build every user customized graph DB. System answers: "Dengue is transmitted by several species of mosquito within the genus *Aedes*, principally *A. aegypti*." System retrieves data from user customized graph database (e.g., FIG. 2 at 218) and finds most probable next question Q3. System suggests question Q3: "According to your location, you may be interested to know about Zika fever. Is this correct?" User responds: "Yes". System updates interaction history database (e.g., FIG. 2 at 216), for example, with data that user preferred Q3 after Q2. User DB Builder (e.g., FIG. 2 at 212) updates user customized graph database (e.g., FIG. 2 at 218). For example, the conditional probability of Q3 occurring given previous question Q2 may be reinforced. System answers: "According to XYZ source, Zika fever is an illness caused by the Zika virus, a member of the family Flaviviridae." System retrieves data from user customized graph database (e.g., FIG. 2 at 218) and finds most probable next question Q4. System suggests question Q4: "Would you like to know the symptoms of Zika fever?" User responds: "No". The interaction history database is updated with data that the predicted question Q4 was not chosen by the user. This data may be interpreted by the user DB builder as a lack of interest by the user in furthering knowledge in one topic for example and by the history analyzer (if a lot of users act as the specified user) as a not so strong connection between these questions, so the probability of Q4 being asked given Q3 may be weakened. System responds: "OK. You may ask another question then."

Figure 11:
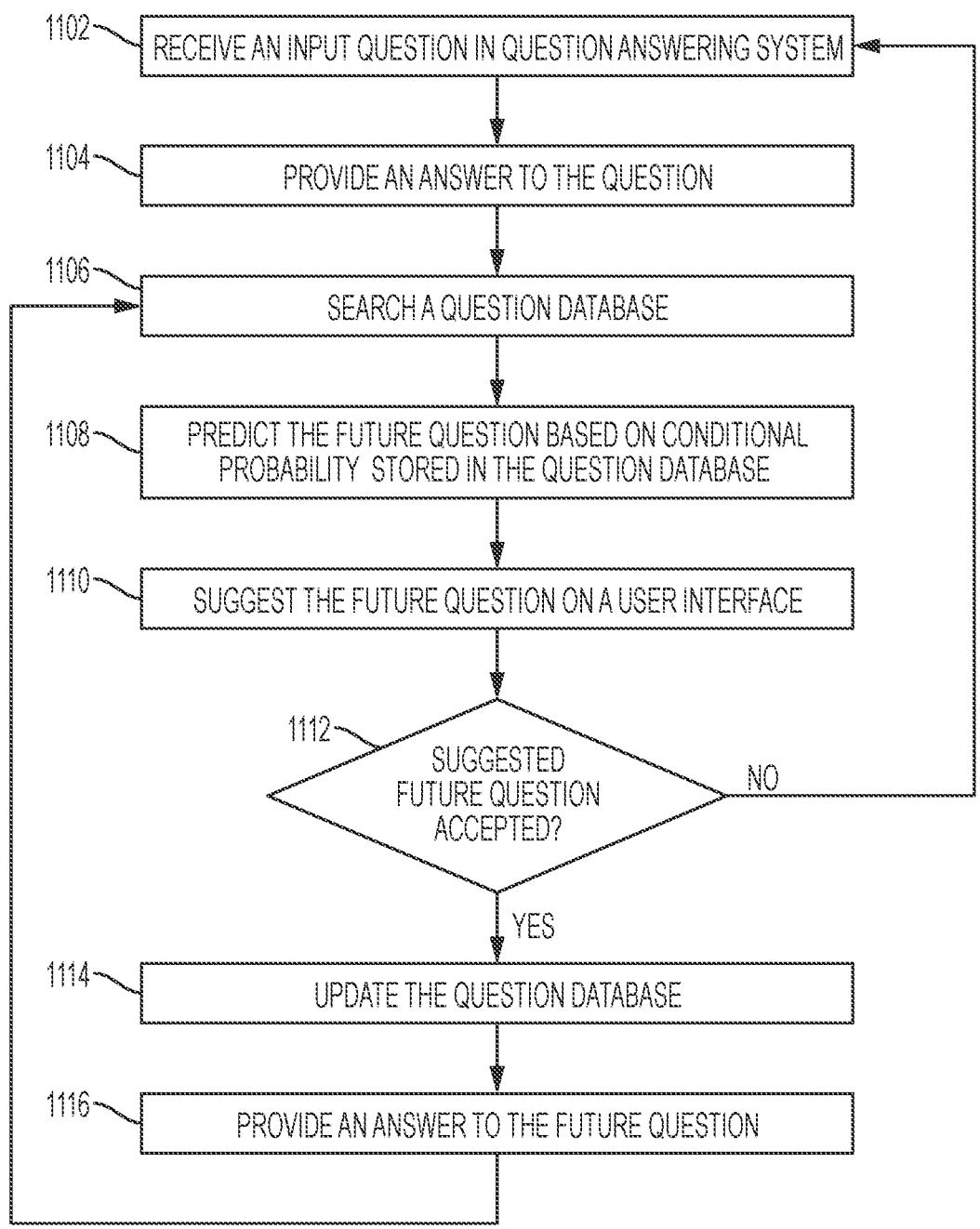
FIG. 11 is a flow diagram illustrating a method of predicting a future question in one embodiment of the present disclosure.

FIG. 11 is a flow diagram illustrating a method of predicting a future question in one embodiment of the present disclosure. The method may predict and present a future question in an automated question answering system. The method may be performed by one or more hardware processors. At 1102, an input question is received in the automated question answering system. At 1104, the automated question answering system may provide an answer to the question. At 1106, a question database is searched. The question database stores questions and a conditional probability of one question to be asked given that a previous question was asked, for all questions in the question database. The conditional probability may be determined based on, for example, one or more of a supervised learning algorithm, natural language processing that determines distance metric between the questions, and user data obtained from a plurality of data sources such as the Internet, social media, social network, online blogs, and/or others. At 1108, the future question may be predicted based on the conditional probability stored in the question database given the input question is asked. At 1110, the future question is suggested on a user interface. At 1112, it is determined whether the future question is accepted. At 1114, responsive to receiving an acceptance of the future question, the question database is updated. For example, the conditional probability associated with the future question occurring given the input question may be reinforced or strengthened. At 1116, an answer to the future question is provided, and the logic repeats at 1106. Responsive to determining that the future question is declined at 1112, the logic returns to 1102, where another question may be received to be answered.

As described above, in some embodiment, the question database is structured as a directed weighted graph comprising nodes representing the questions and edges between the nodes representing links based on conditional probabilities between the questions. Further, in some embodiments, the question database is customized for a particular user in the particular user's current context, and the searching the question database includes searching the customized question database.

As described above, the question database in some embodiments is initially built using domain knowledge, and the supervised learning algorithm is trained with a training data set including the initially built question database. The trained supervised learning algorithm builds the question database based on additional available data.

In some embodiments, the natural language processing that determines distance metric between the questions, and the user data obtained from a plurality of data sources extend the training data set. The supervised learning algorithm may then be automatically retrained based on the extended training data set.

In some embodiments, responsive to not finding the answer to the input question, external network such as the Internet may be searched for the answer to the input question. The input question may be added to the question database, and the supervised learning algorithm may be executed to correlate the input question with conditional probability. The natural language processing information and the user data may also be used to correlate the input question with the conditional probability. The user data may be obtained from social network data, user interaction history, data obtained from a wearable device, global positioning system location data, and/or others.

Figure 12:
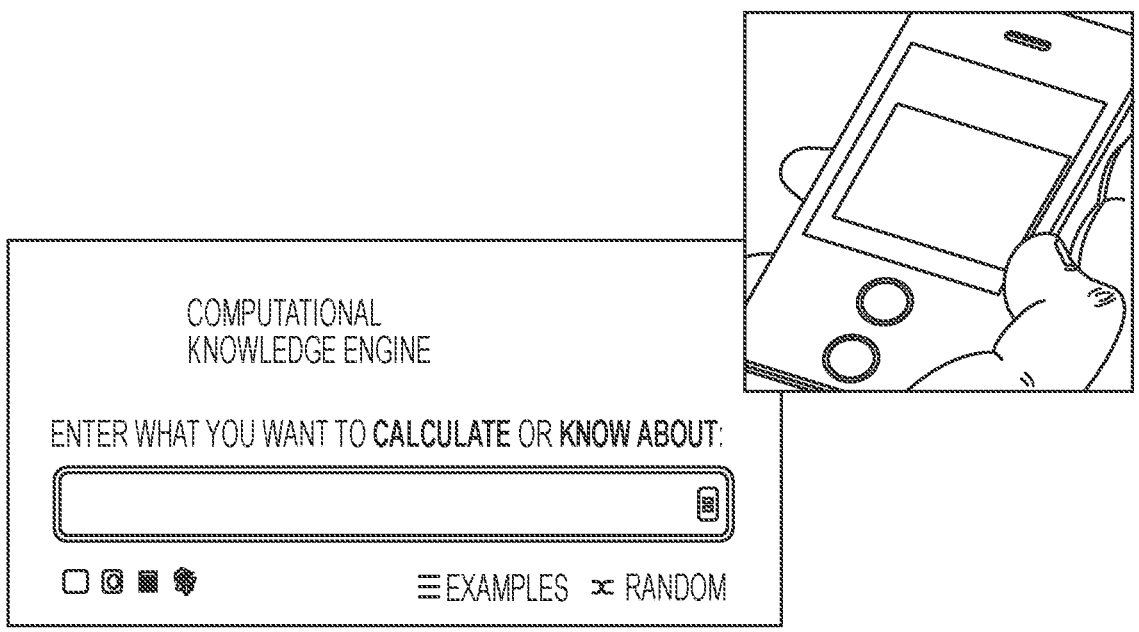
FIG. 12 shows an example user interface on which a user is allowed to pose a question and via which a question may be received for processing as described above.

FIG. 12 shows an example user interface on which a user is allowed to pose a question and via which a question may be received for processing as described above. The user interface, for example, may execute on a computer device, smartphone device or another mobile device.

Figure 13:
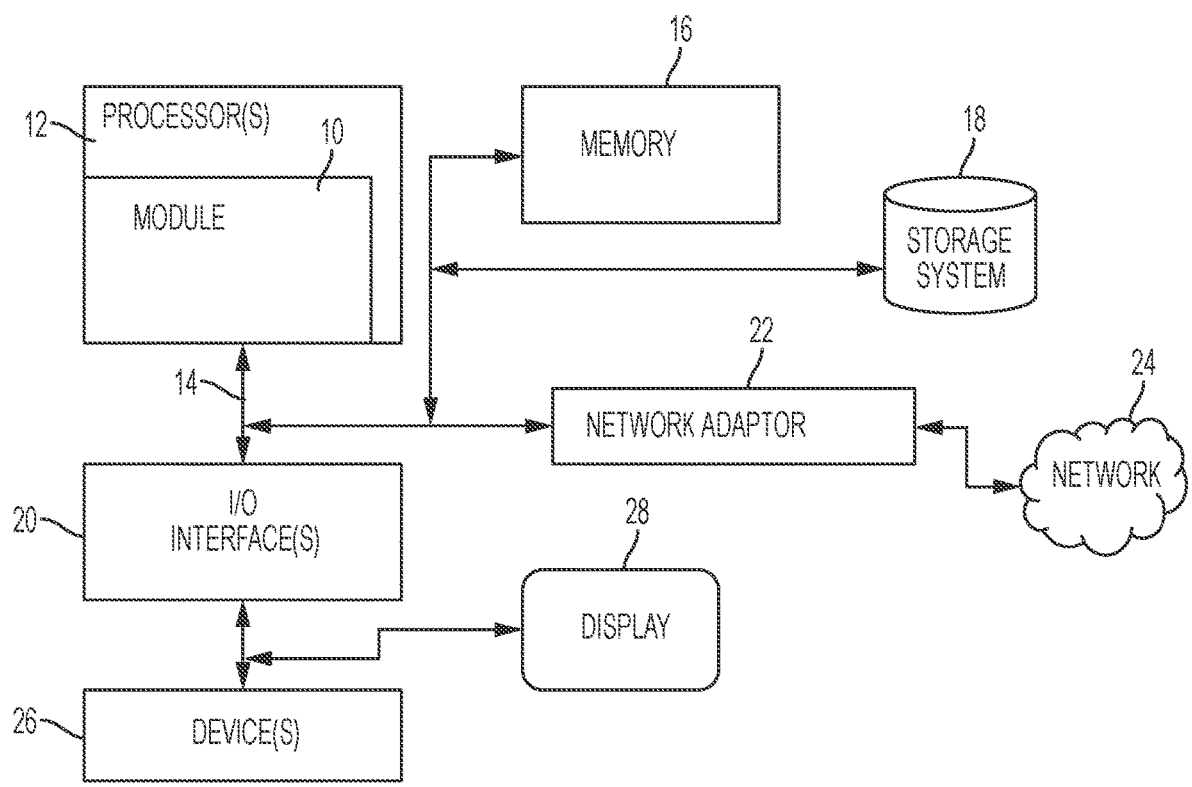
FIG. 13 illustrates a schematic of an example computer or processing system that may implement a question prediction system in one embodiment of the present disclosure.

FIG. 13 illustrates a schematic of an example computer or processing system that may implement a question prediction system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a question prediction module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
   receiving an input question in an automated question answering system;
   searching a question database storing questions and a conditional probability of one question to be asked given that a previous question was asked, the conditional probability determined based on a supervised machine learning algorithm and natural language processing that determines distance metric between the questions;
   predicting a future question based on the conditional probability stored in the question database given the input question as the previous question;
   suggesting the future question; and
   responsive to receiving an acceptance of the future question, updating the question database to strengthen the conditional probability associated with the future question occurring given the input question,
   wherein at least the natural language processing determined distance metric between the questions extends a training data set with which the supervised machine learning algorithm was trained, and wherein the supervised learning algorithm is automatically retrained based on the extended training data set.

2. The method of claim 1, wherein the conditional probability is determined further based on natural language processing that determines distance metric between the questions.

3. The method of claim 1, wherein the conditional probability is determined further based on user data obtained from a plurality of data sources.

4. The method of claim 1, further comprising:
   repeating the searching, the predicting, the suggesting and the updating, with the future question as the input question.

5. The method of claim 1, further comprising:
   providing an answer to the input question.

6. The method of claim 1, further comprising:
   providing an answer to the future question.

7. The method of claim 1, wherein the question database is structured as a directed weighted graph comprising nodes representing the questions and edges between the nodes representing links based on conditional probabilities between the questions.

8. The method of claim 1, wherein the question database is customized for a particular user in the particular user's current context, and the searching the question database comprises searching the customized question database.

9. The method of claim 1, wherein the question database is initially built using domain knowledge, and the supervised learning algorithm is trained with the training data set that includes at least the initially built question database, the trained supervised learning algorithm building the question database based on additional available data.

10. The method of claim 9, wherein user data obtained from a plurality of data sources extend the training data set and the supervised learning algorithm is automatically retrained based on the extended training data set.

11. The method of claim 1, wherein responsive to not finding an answer to the input question, searching an external network for the answer to the input question, adding the input question to the question database, and correlating the input question with the conditional probability based on the supervised learning algorithm.

12. The method of claim 1, wherein responsive to not finding an answer to the input question, searching an external network for the answer to the input question, adding the input question to the question database, and correlating the input question with the conditional probability based on a natural language processing that determines distance metric between the questions.

13. The method of claim 1, wherein responsive to not finding an answer to the input question, searching an external network for the answer to the input question, adding the input question to the question database, and correlating the input question with the conditional probability based on user data obtained from a plurality of data sources.

14. The method of claim 13, wherein the user data comprises social network data.

15. The method of claim 13, wherein the user data comprises user interaction history with the automated question answering system.

16. A computer program product for predicting and presenting a future question in an automated question answering system, the computer program product comprising a computer readable storage medium having program instructions embodied therewith, wherein the computer readable storage medium is not a transitory signal per se, the program instructions readable by a device to cause the device to perform a method comprising:
    receiving an input question in an automated question answering system;
    searching a question database storing questions and a conditional probability of one question to be asked given that a previous question was asked, the conditional probability determined based on a supervised machine learning algorithm and natural language processing that determines distance metric between the questions;
    predicting the future question based on the conditional probability stored in the question database given the input question as the previous question;
    suggesting the future question; and
    responsive to receiving an acceptance of the future question, updating the question database to strengthen the conditional probability associated with the future question occurring given the input question,
    wherein at least the natural language processing determined distance metric between the questions extends a training data set with which the supervised machine learning algorithm was trained, and wherein the supervised learning algorithm is automatically retrained based on the extended training data set.

17. The computer program product of claim 16, wherein the device is further caused to perform, responsive to not finding an answer to the input question, searching an external network for the answer to the input question, adding the input question to the question database, and correlating the input question with the conditional probability based on the supervised learning algorithm.

18. A system of predicting and presenting a future question in an automated question answering system, comprising:
    at least one hardware processor coupled to a communication network;
    a storage device coupled to the at least one hardware processor;
    the at least one hardware processor configured to at least:
        receive an input question in an automated question answering system;
        search a question database storing questions and a conditional probability of one question to be asked given that a previous question was asked, the conditional probability determined based on a supervised machine learning algorithm and natural language processing that determines distance metric between the questions;
        predict the future question based on the conditional probability stored in the question database given the input question as the previous question;
        suggest the future question; and
    responsive to receiving an acceptance of the future question, update the question database to strengthen the conditional probability associated with the future question occurring given the input question,
    wherein at least the natural language processing determined distance metric between the questions extends a training data set with which the supervised machine learning algorithm was trained, and wherein the supervised learning algorithm is automatically retrained based on the extended training data set.

19. The system of claim 18, wherein the at least one hardware processor is further configured to, responsive to not finding an answer to the input question, search an external network for the answer to the input question, add the input question to the question database, and correlate the input question with the conditional probability based on the supervised learning algorithm.

* * * * *